United States Patent
Myers et al.

(10) Patent No.: US 11,995,446 B2
(45) Date of Patent: *May 28, 2024

(54) BRANCH PREDICTOR STORING ENCRYPTED INFORMATION

(71) Applicant: Apple Inc., Cupertino, CA (US)

(72) Inventors: Steven A. Myers, San Jose, CA (US); Jeffry E. Gonion, Campbell, CA (US); Yannick L. Sierra, San Francisco, CA (US); Thomas Icart, Paris (FR)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/661,696

(22) Filed: May 2, 2022

(65) Prior Publication Data
US 2022/0326957 A1   Oct. 13, 2022

Related U.S. Application Data

(63) Continuation of application No. 16/663,621, filed on Oct. 25, 2019, now Pat. No. 11,321,095, which is a
(Continued)

(51) Int. Cl.
*G06F 9/38* (2018.01)
*G06F 9/30* (2018.01)
(Continued)

(52) U.S. Cl.
CPC ........ *G06F 9/3844* (2013.01); *G06F 9/30029* (2013.01); *G06F 9/45558* (2013.01);
(Continued)

(58) Field of Classification Search
CPC .................................................. G06F 9/3844
See application file for complete search history.

(56) References Cited

U.S. PATENT DOCUMENTS

| | | |
|---|---|---|
| 5,276,882 A | 1/1994 | Emma et al. |
| 5,574,871 A | 11/1996 | Hoyt et al. |

(Continued)

OTHER PUBLICATIONS

Julia Borghoff, et al., "Prince—A Low-latency Block Cipher for Pervasive Computing Applications," Proceedings of the 18th international conference on The Theory and Application of Cryptology and Information Security, Dec. 2-6, 2012, pp. 208-225.
(Continued)

*Primary Examiner* — Jacob Petranek
(74) *Attorney, Agent, or Firm* — Kowert, Hood, Munyon, Rankin & Goetzel, P.C.; Paul T. Seegers; Dean M. Munyon

(57) ABSTRACT

Techniques are disclosed relating to protecting branch prediction information. In various embodiments, an integrated circuit includes branch prediction logic having a table that maintains a plurality of entries storing encrypted target address information for branch instructions. The branch prediction logic is configured to receive machine context information for a branch instruction having a target address being predicted by the branch prediction logic, the machine context information including a program counter associated with the branch instruction. The branch prediction logic is configured to use the machine context information to decrypt encrypted target address information stored in one of the plurality of entries identified based on the program counter. In some embodiments, the branch prediction logic decrypts the encrypted target address information by performing a cipher to encrypt the machine context information and performing a Boolean exclusive-OR operation of the encrypted machine context information and the encrypted target address information.

17 Claims, 12 Drawing Sheets

Related U.S. Application Data continuation-in-part of application No. 16/220,488, filed on Dec. 14, 2018, now Pat. No. 11,449,343.

(60) Provisional application No. 62/855,887, filed on May 31, 2019.

(51) Int. Cl.
*G06F 9/455* (2018.01)
*G06F 21/60* (2013.01)
*G06F 21/52* (2013.01)
*G06F 21/62* (2013.01)

(52) U.S. Cl.
CPC ............ *G06F 21/602* (2013.01); *G06F 21/52* (2013.01); *G06F 21/6209* (2013.01)

(56) References Cited

U.S. PATENT DOCUMENTS

| | | |
|---|---|---|
| 5,935,241 A | 8/1999 | Shiell et al. |
| 6,212,629 B1 | 4/2001 | McFarland et al. |
| 8,762,694 B1 | 6/2014 | Zou et al. |
| 8,955,111 B2 | 2/2015 | Glew et al. |
| 10,037,288 B2 | 7/2018 | Guim et al. |
| 2011/0296206 A1 | 12/2011 | Henry et al. |
| 2014/0297996 A1 | 10/2014 | Jayaseelan |
| 2015/0268957 A1 | 9/2015 | Bonanno et al. |
| 2016/0154746 A1 | 6/2016 | Cooke |
| 2016/0170769 A1 | 6/2016 | LeMay |
| 2018/0365015 A1 | 12/2018 | Lee et al. |
| 2019/0042263 A1 | 2/2019 | Sukhomlinov et al. |
| 2019/0163902 A1 | 5/2019 | Reid et al. |
| 2019/0166158 A1 | 5/2019 | Grocutt et al. |
| 2019/0227802 A1 | 7/2019 | Kessler et al. |
| 2019/0303161 A1* | 10/2019 | Nassi ................ G06F 9/3844 |
| 2020/0057641 A1 | 2/2020 | Leenstra et al. |

OTHER PUBLICATIONS

Park et al., "Repairing Return Address Stack for Buffer Overflow Protection," ACM 2004 (Year: 2004), pp. 335-342.

Wikipedia: Branch (computer science). pp. 1-5. Feb. 2021. (Year: 2021).

\* cited by examiner

BRANCH PREDICTOR STORING ENCRYPTED INFORMATION

PRIORITY INFORMATION

The present application is a continuation of U.S. application Ser. No. 16/663,621, entitled "INDIRECT BRANCH PREDICTOR SECURITY PROTECTION," filed Oct. 25, 2019 (now U.S. Pat. No. 11,321,095), which is a continuation-in-part of U.S. application Ser. No. 16/220,488, entitled "INDIRECT BRANCH PREDICTOR STORING ENCRYPTED BRANCH INFORMATION FIELDS AND SECURITY TAG FOR SECURITY PROTECTION," filed Dec. 14, 2018, and which further claims priority to U.S. Prov. Appl. No. 62/855,887, entitled "INDIRECT BRANCH PREDICTOR SECURITY PROTECTION," filed May 31, 2019; the disclosures of each of the above-referenced applications are incorporated by reference herein in their entireties.

BACKGROUND

Technical Field

This disclosure relates generally to computing systems and, more particularly, to efficiently protecting branch prediction information.

Description of the Related Art

Modern instruction schedulers in microprocessors select multiple dispatched instructions out of program order to enable more instruction level parallelism, which reduces instruction latencies and increases performance. Additionally, microprocessors use store-to-load forwarding to send the data corresponding to a store instruction to a dependent load instruction. To further increase performance and reduce instruction latencies, the microprocessor performs speculative execution by predicting events that may happen in upcoming pipeline stages. One example is predicting the target address of control transfer instructions as well as the direction (e.g., taken or not-taken). Examples of control transfer instructions are conditional branch instructions, jump instructions, call instructions in subroutine prologues and return instructions in subroutine epilogues.

The direction and the target address of the control transfer instruction is used to update the program counter (PC) register holding the address of the memory location storing the next one or more instructions of a computer program to fetch. During speculative execution, each of the direction and the target address are predicted in a first pipeline stage. The direction and the target address are resolved in a second pipeline stage that is one or more pipeline stages after the first pipeline stage. In the meantime, between the first and the second pipeline stages, younger instructions, which are dependent on the control transfer instruction, are selected out-of-order for issue and execution.

Branch predictors typically include a table with entries storing branch prediction information such as a branch target address. One example is an indirect branch predictor. Branch predictor tables are susceptible to malicious attacks. Malicious users use malicious code to control a processor, and this control typically leads to accessing sensitive data. One example of malicious code are instructions written by the malicious users and injected into a computing system, which are voluntarily executed by the user. For example, when the user voluntarily selects (clicks) on an attachment on a web page or in electronic mail (email), the malicious code is run by the processor.

Another example of malicious code is a code re-use attack. The malicious user has access to one or more of compiled binary code, the operating system's shared libraries, and so forth. The malicious user searches for instruction sequences within the process address space that access sensitive data. The malicious user inserts or overwrites branch prediction information in a branch prediction table, which causes the processor to direct control flow of a computer program to the malicious memory location storing malicious code. This malicious code contains the instructions sequences found from the search. Although the branch misprediction is later detected and the machine state is reverted to the machine state prior to the mispredicted branch instruction, the access to the sensitive data has still occurred.

Figure 1:
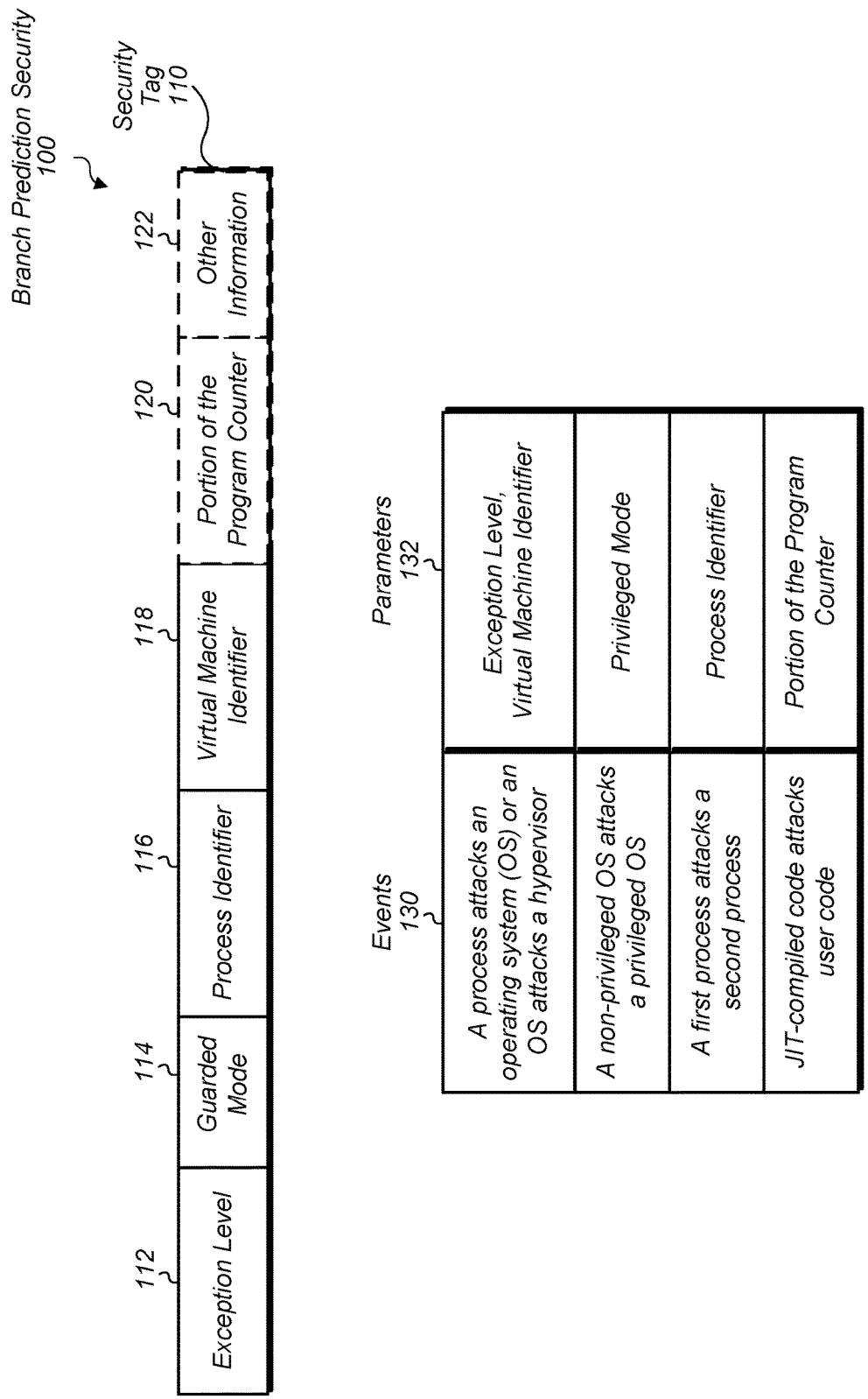
FIG. 1 is a block diagram of one embodiment of branch prediction security.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation— [entity] configured to [perform one or more tasks]— is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. "Branch prediction logic configured to predict a target address for a branch instruction" is intended to cover, for example, circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. Thus, the "configured to" construct is not used herein to refer to a software entity such as an application programming interface (API).

The term "configured to" is not intended to mean "configurable to." An unprogrammed FPGA, for example, would not be considered to be "configured to" perform some specific function, although it may be "configurable to" perform that function and may be "configured to" perform the function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, a mobile device may have a first user and a second user. The term "first" is not limited to the initial user of the device. The term "first" may also be used when only one user of the mobile device exists.

As used herein, the term "based on" is used to describe one or more factors that affect a determination. This term does not foreclose the possibility that additional factors may affect a determination. That is, a determination may be solely based on specified factors or based on the specified factors as well as other, unspecified factors. Consider the phrase "determine A based on B." This phrase specifies that B is a factor used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

DETAILED DESCRIPTION

As will be described below, branch prediction logic in a processor may employ various techniques for efficiently protecting branch prediction information. The present disclosure begins with respect to FIGS. 1-7 by describing embodiments in which a security tag field may be added to a branch prediction table to store machine context information for branch instructions being executed (e.g., exception levels, virtual machine identifiers, process identifiers, privileged/guard mode indications, portions of program counters, etc.); this information can then be verified to ensure that predictions are being made for branch instructions executing with the same (or similar) machine contexts as those modifying the branch prediction table. Embodiments are also discussed in which one or more fields of branch prediction information are encrypted using machine context information. The present disclosure then discusses an efficient cipher for quickly encrypting and decrypting this branch prediction information with respect to FIGS. 8-9C. Lastly, examples of a processor core and a system, which may implement one or more of the protection techniques described herein, are presented with respect to FIGS. 10 and 11.

Security Tags and Prediction Information Encryption

Turning now to FIG. 1, a generalized block diagram of one embodiment of branch prediction security 100 is shown. As shown, security tag 100 includes multiple fields such as fields 112-122. In various embodiments, one or more of the fields 112-122 stores a parameter, such as one of parameters 132, each associated with one or more events of events 130. In some embodiments, security tag 110 is stored in entries of a branch prediction table to combat security attacks on the branch prediction table. If a malicious user is able to overwrite or allocate an entry in the branch prediction table, then the malicious user is able to direct control of a software application to a particular memory location by providing a malicious branch target address. The events 130 list a sample of security attacks. The associated parameters 132 are used to detect whether one of these events has occurred. These parameters 132 are stored in the security tag 110 to aid detecting the events 130.

Although the parameters in the fields 112-122 are shown in a particular contiguous order, in other embodiments, another order is used and one or more of the fields 112-122 are arranged in a non-contiguous manner. In addition, one or more of the fields 112-122 are unused in the security tag 110. Further, one or more fields not shown are used in the security tag 110. For example, the field 122 includes other information not shown in the illustrated embodiment, but is used to detect security attacks.

In many designs, a branch prediction table, such as an indirect branch prediction table, stores a subset of the program counter (PC) in its table entries. This subset of the PC is used to index into the table and qualify an indexed entry as a hit (i.e., a match) with a tag. The subset of the PC leads to aliasing, which a malicious user can exploit. As shown, one event of events 130 is when a software process attacks an operating system (OS) or an OS attacks a hypervisor. In either case, one or more of the exception levels (ELs) and the virtual machine identifiers (VMIDs) differ from expected values. In an embodiment, the security tag 110 includes the exception level in field 112 and the VMID in field 118. However, these parameters are stored in other fields in other embodiments.

When a malicious user is able to control a virtual machine, typically, the malicious user accesses hypervisor data, which is normally inaccessible. However, in one example, a virtual machine has an exception level with a value or 0 or 1, whereas, the hypervisor has an exception level with a value of 2. Therefore, the exception levels can be used to detect whether the source attempting to modify a branch prediction table is a valid source. Similarly, a software process and an operating system have different exception levels. If the malicious user attempts to access information belonging to another virtual machine, then the VMIDs differ, and the field 118 of the security tag 110 stored in an entry of the branch prediction table is used to detect the attack. Without the security tag 110 stored in the branch predictor table, it is possible that the attack continues or completes undetected.

Another example of the above type of attack is when the malicious user is aware of a first PC of a kernel indirect branch instruction that contains a particular index and tag. The malicious user writes user code with an indirect branch instruction pointed to by a second PC that contains the same index and tag as the first PC. By using the second PC, the user code trains the indirect branch prediction table to provide a branch target address to malicious code. In this example, however, this type of attack may result in the security tag 110 of the kernel code differing from the security tag 110 of the user code—the exception level being one example of potentially differing content. As such, this type of attack may be detected and thwarted when these tags 110 are compared and determined to differ from one another.

A second event of events 130 is when an unguarded non-privileged operating system (OS) attacks a privileged OS. The privileged mode for an operating system is also referred to as the protected mode. In the privileged mode, the processor running the operating system detects when a first program attempts to write to memory locations used by a second program or by the kernel. In response, the processor notifies the kernel, which terminates the first program. During the second event of events 130, the privileged mode of parameters 132 differs between the OSes. In many examples, the privileged mode is a single bit. The field 114 of the security tag 110 stored in an entry of the branch predictor table is used to detect the attack. Without the security tag 110 stored in the branch predictor table, it is possible that the attack continues or completes undetected.

In a similar manner as the second event, a third event of events 130 is when a first process attacks a second process. During the third event of events 130, the process identifier of parameters 132 differs between the processes. The field 116 of the security tag 110 stored in an entry of the branch predictor table is used to detect the attack. For example, code for a malicious website is loaded by the web browser and executes on the user's computing device. The malicious code attempts to steal data from a banking application or other applications with access to sensitive data.

Another event of events 130 is when just-in-time (JIT) compiled code attacks user code. During this event, a portion of the program counter (PC) corresponding to the branch instruction differs between the JIT-complied code and the user code. In one example, the PC points to the branch instruction stored in memory. In other examples, the PC points to a group of instructions stored in memory that include the branch instruction. The field 120 of the security tag 110 stored in an entry of the branch predictor table is used to detect the attack. For example, a first piece of code, which is malicious, executes with a same privilege level, a same process identifier, and a same virtual machine identifier. One example of this case is when JavaScript code runs in the same process as a trusted web browser. The malicious JavaScript code attempts to access data from the web browser application. Examples of the data are a browsing history, one or more passwords, and so forth. One solution is to widen the portion of the PC in the field 120 of the security tag 110. Another solution is to combine the portion of the PC with the branch target address. For example, the two values are combined using the Boolean exclusive-OR (XOR) operation. The result is stored in the table entry of the indirect branch prediction table and later verified when the table entry is accessed.

During any one of the events of events 130, an attack has occurred and detecting the attack is done by storing the security tag 110 in each entry of the branch prediction table. In an embodiment, the branch prediction table is used for predicting the target address of indirect branches. When a given entry is allocated in the branch prediction table, the security tag 110 indicates a specific source of the predicted branch target address. At a later point in time, the branch prediction table is accessed. For example, a hash value is used to index into the branch prediction table. In one example, the hash value is generated from the program counter and history information and hits on the given entry. However, if one or more of the fields in the security tag 110 do not match, then the branch prediction is ignored and no updates occur for the given entry (e.g., updates of the history information, branch prediction training information, or otherwise). In some embodiments, an exception is generated to notify the operating system of the malicious access.

Figure 2:
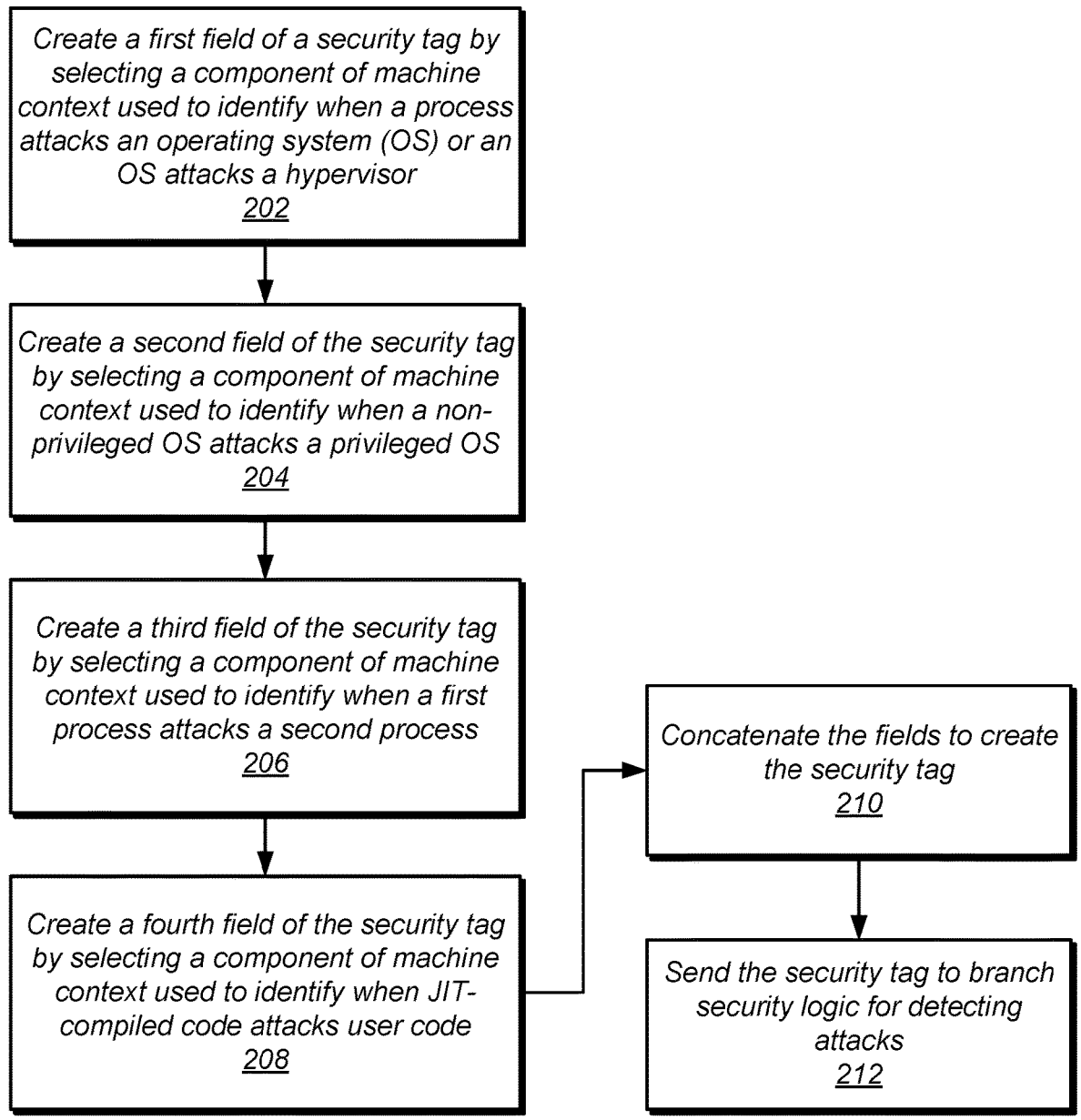
FIG. 2 is a flow diagram of one embodiment of a method for efficiently protecting branch prediction information.

Turning now to FIG. 2, a generalized flow diagram of one embodiment of a method 200 for efficiently protecting branch prediction information is shown. For purposes of discussion, the steps in this embodiment (as well as for FIGS. 5-7) are shown in sequential order. However, in other embodiments some steps may occur in a different order than shown, some steps may be performed concurrently, some steps may be combined with other steps, and some steps may be absent.

A security tag is stored in entries of a branch prediction table to protect the information stored in the branch prediction table. In one example, the table is used to provide predicted branch target addresses for indirect branch instructions. The security tag includes multiple fields with each field used to detect a respective type of malicious attack. Each field stores parameters corresponding to a particular portion of the machine context. The machine context is the state of the processor while it is executing one or more processes and their corresponding threads. The machine context is the information used to restore and resume execution of the one or more processes, if needed. A first field of the security tag is created by selecting a component of machine context used to identify when a process attacks an operating system (OS) or an OS attacks a hypervisor (block 202). For example, one or more of the exception levels (ELs) and the virtual machine identifiers (VMIDs) are placed in the security tag.

A second field of the security tag is created by selecting a component of machine context used to identify when a non-privileged OS attacks a privileged OS (block 204). In one example, the privileged mode bit is placed in the security tag. A third field of the security tag is created by selecting a component of machine context used to identify when a first process attacks a second process (block 206). The process identifier differs between processes, and it is inserted in the security tag.

A fourth field of the security tag is created by selecting a component of machine context used to identify when uncompiled or JIT-compiled code attacks user code (block 208). For example, when just-in-time (JIT) complied code attacks user code, at least a portion of the program counter (PC) of the branch instruction differs. Therefore, in some examples, the portion of the PC of the branch instruction is placed in the security tag. The fields are concatenated to create the security tag (block 210), and the security tag is sent to branch security logic for detecting attacks (block 212). For example, the security tag is stored in the entries of the branch prediction table and later compared when the particular entry is accessed by a subsequent branch instruction. In various embodiments, the logic described herein may include hardware (e.g., circuitry) and/or software (e.g., executable instructions).

Figure 3:
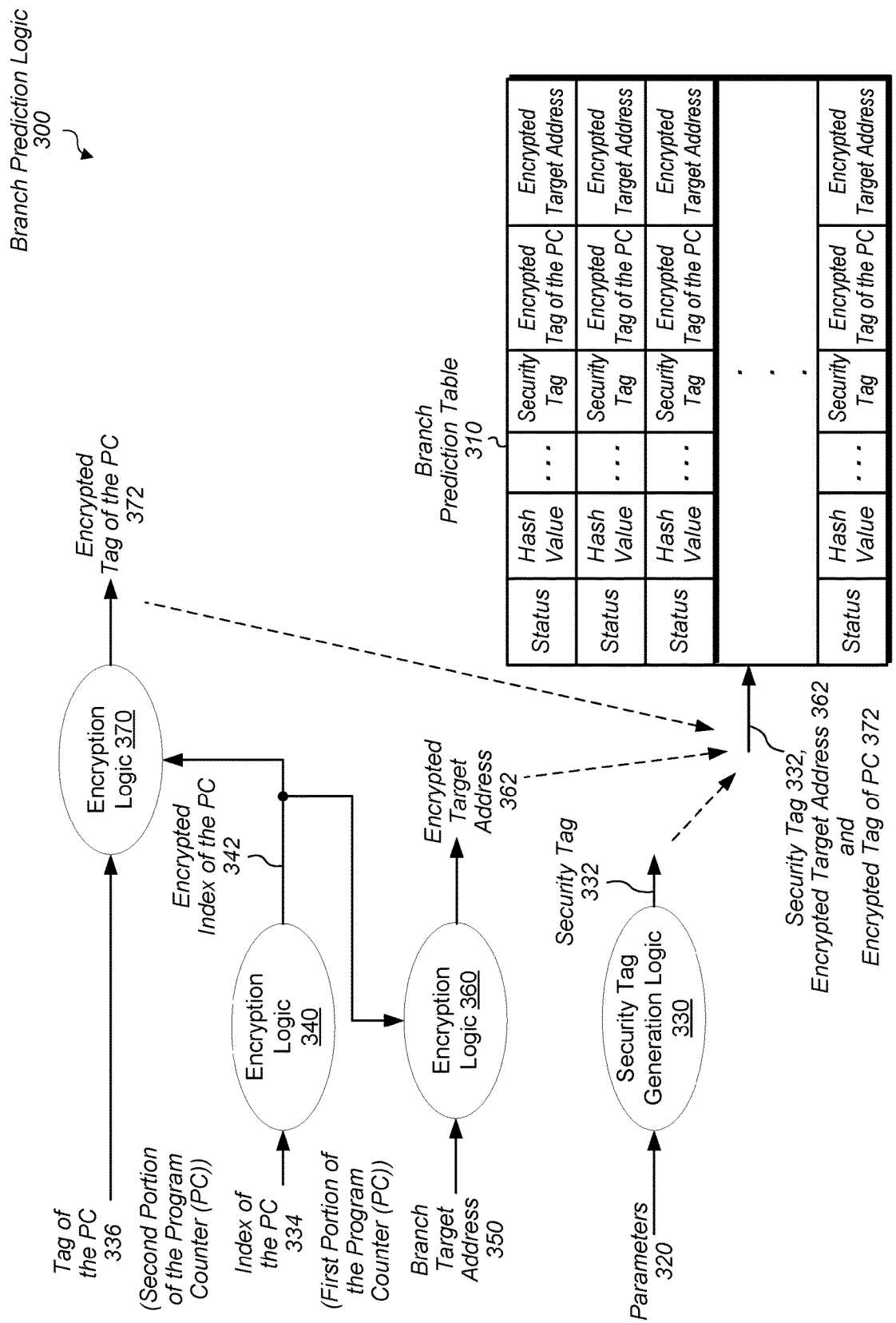
FIG. 3 is a block diagram of one embodiment of branch prediction logic.

Turning now to FIG. 3, a generalized block diagram of one embodiment of branch prediction logic 300 is shown. Branch prediction logic 300 includes branch prediction table 310 (or table 310) and multiple logic blocks 330, 340, 360 and 370. In some embodiments, the branch prediction logic 300 is used for indirect branch instructions (or indirect branches). In other embodiments, the branch prediction logic 300 is used for other types of branches such as direct branch instructions, indirect jump instructions, return instructions, or other forms of control transfer instructions.

As shown, each table entry of table 310 stores multiple fields. A status field includes a valid bit and metadata such as a source identifier, an age, a value for a least-recently-used (LRU) replacement scheme, and so forth. The hash value stores a hash generated at the time the table entry was allocated for a branch instruction. Any one of a variety of hash functions, or algorithms, is used to generate the hash value. A portion of the program counter of the branch instruction and branch history information is input to the hash algorithm to generate the hash value. In some examples, one or more other inputs are additionally used such as a key, a timestamp, and so on.

Each table entry of table 310 also stores a security tag and branch prediction information. In various embodiments, the security tag 332 is equivalent to the security tag 110 (of FIG. 1). In some embodiments, the branch prediction information is a branch target address (or an offset applied to a program counter to produce the branch target address). In other embodiments, the branch prediction information is information used to predict a branch direction (e.g., taken or not-taken). The branch prediction logic 300 is used to allocate a table entry in table 310. Later, the branch prediction logic 400 (of FIG. 4) is shown for reading out information from table 310. Therefore, the branch prediction logic 300 is used for writing the table 310, and the branch prediction logic 400 is used for reading the table 310.

In the illustrated embodiment, the branch prediction logic 300 receives parameters 320, an index of the program counter (PC) 334, which is a first portion of the PC, corresponding to a branch instruction. In addition, the branch prediction logic 300 receives a branch target address 350. In various embodiments, the index of the PC 334 is a subset of a complete PC. Any subset of the PC is possible and contemplated. Although the branch target address 350 is shown, in other embodiments, other branch prediction information is used such as branch direction information. In one example, a 1-bit count, a 2-bit count, or other sized count is used. When a branch instruction is resolved, and there is no table entry for the branch instruction in the table 310, and the type of the branch instruction matches the type of branch instruction associated with the table 310, then a table entry is allocated in the table 310. For example, if an indirect branch instruction is resolved, but there is no allocated table entry in the table 310, and the table 310 is used for indirect branches, then a table entry is allocated in the table 310 for the branch instruction.

Once a table entry is selected for allocation in the table 310, as described earlier, a hash value is generated as described earlier and stored in the selected table entry. In an embodiment, the hash algorithm (not shown) receives the index of the PC 334. In another embodiment, the hash algorithm receives a different portion of the PC than the index of the PC 334. In some embodiments, the encryption logic 340, which is separate from the hash algorithm, encrypts the index of the PC 334 to generate the encrypted index of the PC 342. The encryption logic 340 includes one of a variety of encryption algorithms. In some examples, the encryption logic 340 receives other inputs (not shown) such as one or more of a timestamp, a cryptographic key, and so forth. The cryptographic key may be a secret value from a security processor that changes at given points in time such as during each boot process, after a fixed period of time, etc. In some embodiments, the encrypted index of the PC 342 is used to encrypt one or more of the tag of the PC 332 and the branch target address 350.

The logic 360 receives the branch target address 350 and generates the encrypted branch target address 362. In an embodiment, the logic 360 uses any one of a variety of encryption algorithms. In one example, the logic 360 uses Boolean exclusive-OR (XOR) logic. In an embodiment, the logic 360 combines the branch target address 350 and the encrypted index of the PC 342 using the Boolean XOR logic to generate the encrypted branch target address 362. The encrypted branch target address 362 is stored in the selected table entry being allocated.

In an embodiment, the security tag generation logic 330 uses the same cryptographic key used by the encryption logic 340. In some embodiments, the logic 370 is similar to the logic 360. Therefore, in some embodiments, the logic 370 combines the tag of the PC 336 and the encrypted index of the PC 342 using Boolean XOR logic to generate the encrypted tag of the PC 372. In various embodiments, parameters 320 are equivalent to the parameters 132 (of FIG. 1). Security tag generation logic 330 receives the parameters 320 and generates the security tag 332. Again, in various embodiments, the security tag 332 is equivalent to the security tag 110 (of FIG. 1). In some embodiments, the security tag generation logic 330 concatenates the selected parameters 320 in an expected order. The security tag 332 is stored in the selected table entry being allocated.

Figure 4:
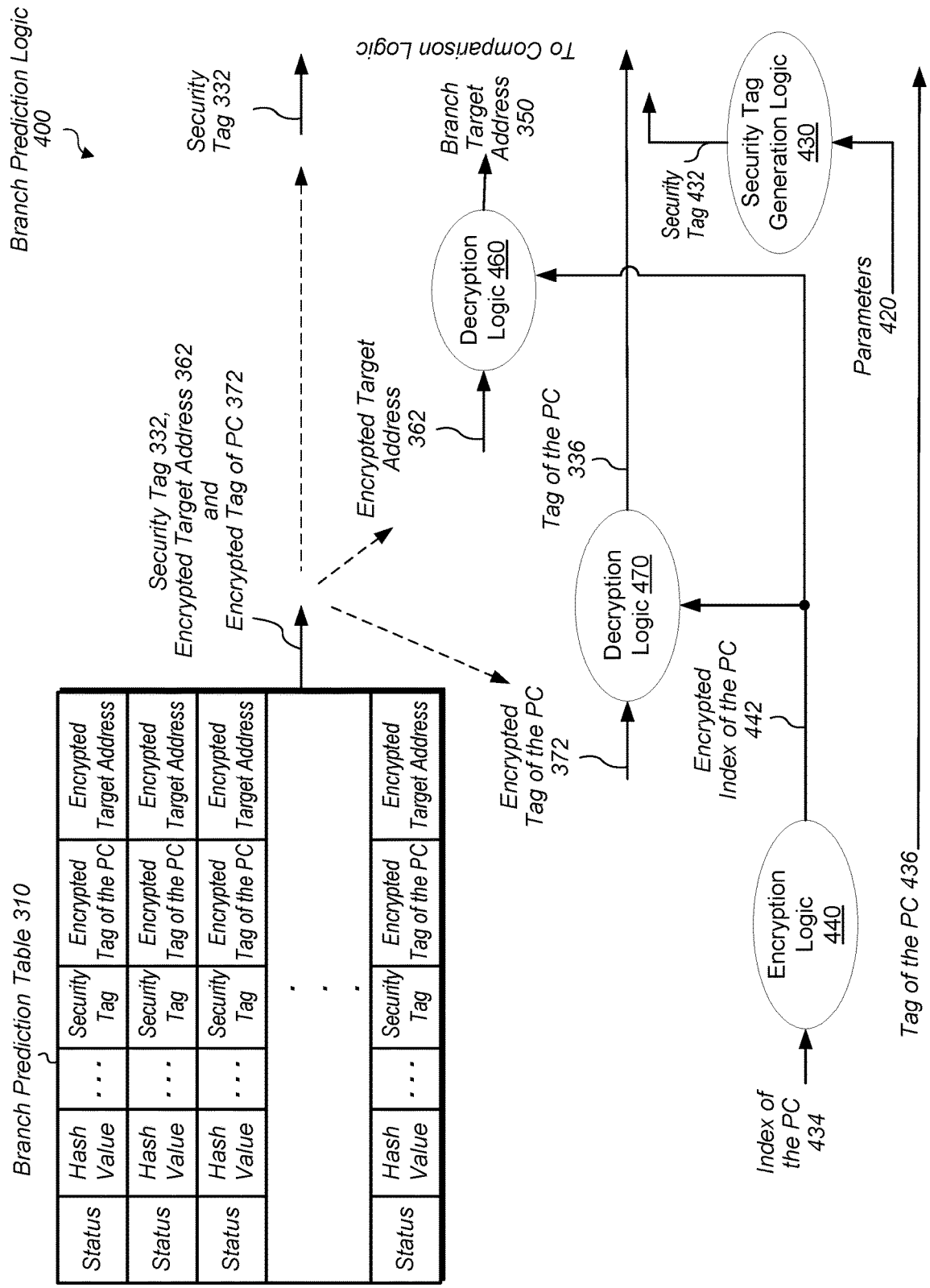
FIG. 4 is a block diagram of one embodiment of branch prediction logic.

Turning now to FIG. 4, a generalized block diagram of one embodiment of branch prediction logic 400 is shown. Circuitry and logic previously described are numbered identically. Branch prediction logic 400 includes branch prediction table 310 (or table 310) and multiple logic blocks 440, 460 and 470. In some embodiments, the branch prediction logic 400 is used for indirect branch instructions (or indirect branches). In other embodiments, the branch prediction logic 400 is used for other types of branches.

When the branch prediction logic 400 receives a portion of a program counter (PC) of a branch instruction being predicted, access logic (not shown) in the branch prediction logic 400 accesses the table 310 using at least the received portion of the program counter. In some embodiments, the portion of the PC used for accessing the table 310 is the same as the index of the PC 434. For example, the access logic generates a hash from the index of the PC 434 and maintained branch history information. In other examples, other values are additionally used in the hash function to generate the hash. The access logic indexes into the table 310 using the generated hash. When a hit occurs, such as on a given table entry, the access logic reads out a security tag, a tag of the PC and branch prediction information from the given table entry. In some embodiments, the tag of the PC and branch prediction information are encrypted. In an embodiment, the branch prediction information is a branch target address. In the illustrated embodiment, the encrypted tag of the PC 372, the encrypted branch target address 362 and the security tag 332 are read out from the table 310.

In some embodiments, the encryption logic 440, which is separate from the hash algorithm, encrypts the index of the PC 434 to generate the encrypted index of the PC 442. In various embodiments, the encryption logic 440 is equivalent to the encryption logic 340 (of FIG. 3). The logic 460 receives the encrypted branch target address 362 and generates the decrypted branch target address 350, or simply, the branch target address 350. In an embodiment, the logic 460 is equivalent to the logic 360 (of FIG. 3) and uses Boolean exclusive-OR (XOR) logic. In an embodiment, the logic 460 combines the encrypted branch target address 362 and the encrypted index of the PC 442 using the Boolean XOR logic to generate the decrypted branch target address 350. Accordingly, in the illustrated embodiment, if the same PC index 434 used to decrypt branch target address 350 is the same PC index 334 used to encrypt the branch target address 350, the branch target address 350 should decrypt correctly. If, however, malicious code having a branch instruction is attempting to interfere, the branch instruction may have a different PC index 434 causing branch instruction address 350 to be decrypted incorrectly. This incorrect decryption may result in a page fault exception (as execution attempts to access an address outside of the malicious code's address range or area of non-executable data) or may result in execution jumping to some random, benign location—regardless of whether one or more components of machine context match security tag 322 in the comparison discussed below.

In a similar manner as described above, the logic 470 receives the encrypted tag of the PC 372 and generates the decrypted security tag 336, or simply, the tag of the PC 336. In an embodiment, the logic 470 is equivalent to the logic 370 (of FIG. 3) and uses Boolean exclusive-OR (XOR) logic. In an embodiment, the logic 470 combines the encrypted tag of the PC 372 and the encrypted index of the PC 442 using the Boolean XOR logic to generate the tag of the PC 336. In various embodiments, parameters 420 are equivalent to the parameters 332 (of FIG. 3) and parameters 132 (of FIG. 1). Security tag generation logic 430 receives the parameters 420 and generates the security tag 432. In some embodiments, the security tag generation logic 430 is equivalent to the security tag generation logic 330 (of FIG. 3).

External comparison logic compares one or more components of machine context from the security tag 332 to one or more components of machine context of the security tag 432 to determine whether the access of the table 310 is a valid access. If the security tag 332 was further encrypted, then it is decrypted prior to the comparison. In some embodiments, the external comparison logic also compares the received tag of the PC 436 to the tag of the PC 336. When the comparison logic detects at least one mismatch during the comparison (e.g., due to mismatching components or the incorrect PC index 434 being used for decryption), in some embodiments, the detected mismatch serves to prevent use of the branch target address 350. Additionally, the detected mismatch is used to prevent updating any branch prediction training information of the given table entry and any maintained global branch history information. In some embodiments, logic to prevent such updates is within the branch prediction logic 400. In other embodiments, the prevention logic is located external to the branch prediction logic 400.

Figure 5:
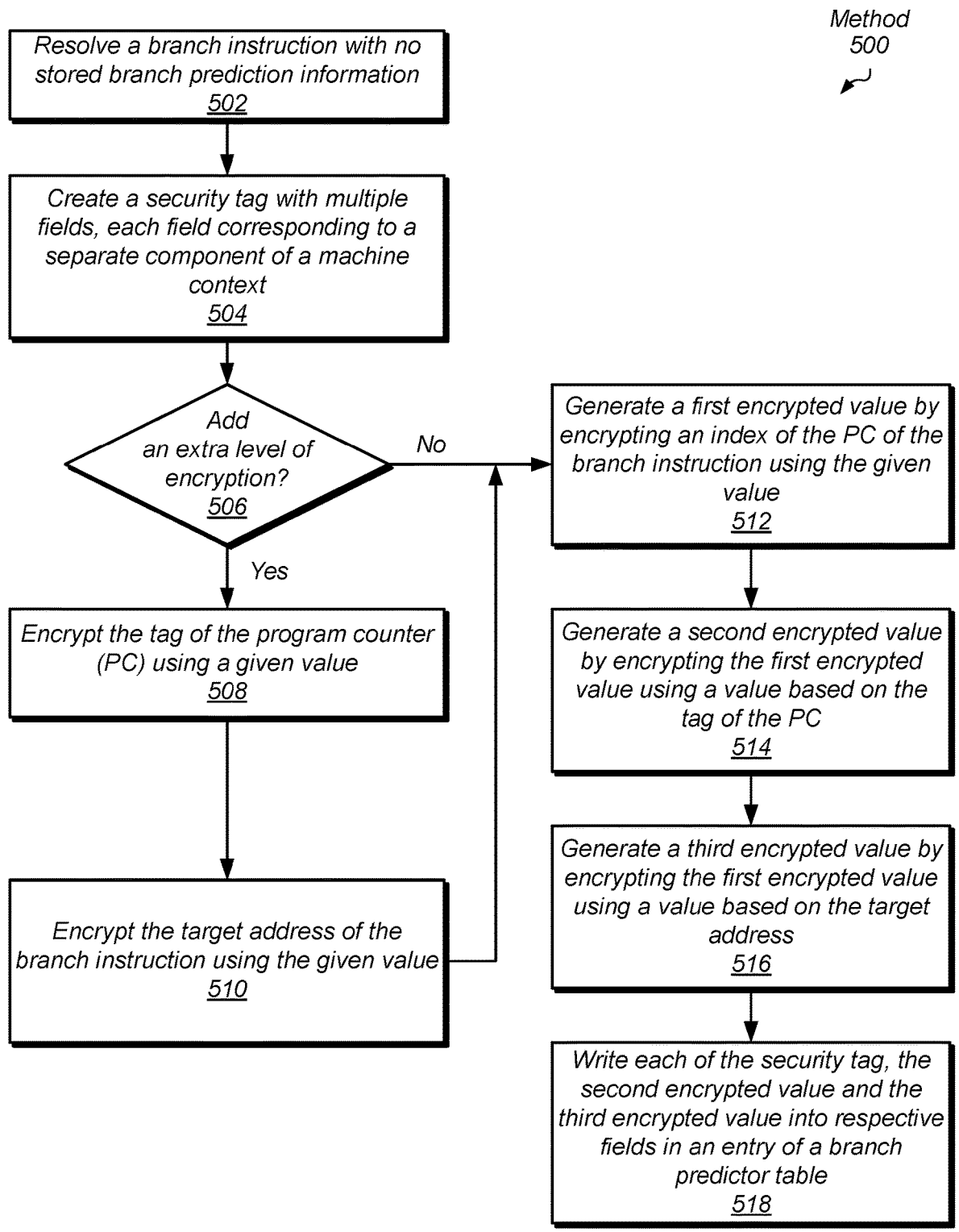
FIG. 5 is a flow diagram of one embodiment of a method for efficiently protecting branch prediction information.

Turning now to FIG. 5, a generalized flow diagram of one embodiment of a method 500 for efficiently protecting branch prediction information is shown. A branch instruction with no stored branch prediction information is resolved (block 502). For example, a branch instruction has been fetched, decoded, issued and executed in a processor core. Currently, no branch prediction tables store information for the branch instruction. Logic in the processor core creates a security tag with multiple fields, each field corresponding to a separate component of a machine context. The machine context is the state of the processor while it is executing one or more processes and their corresponding threads. The machine context is the information used to restore and resume execution of the one or more processes, if needed. An example of the security tag is the security tag 110 illustrated previously in FIG. 1.

If an extra level of encryption is being added ("yes" branch of the conditional block 506), then logic encrypts the tag of the program counter (PC) using a cryptographic key (block 508). In some examples, one or more other inputs are additionally used for encrypting the tag of the PC. Logic also encrypts the target address of the branch instruction using the given value (block 510). Therefore, in some embodiments, the logic uses the same cryptographic key to encrypt the branch target address. In other embodiments, the branch prediction information includes a branch direction, rather than a branch target address.

If an extra level of encryption is not being added ("no" branch of the conditional block 506), or blocks 508 and 510 have completed, then logic generates a first encrypted value by encrypting an index of the program counter (PC) of the branch instruction using the cryptographic key (block 512). Therefore, again, logic uses the same cryptographic key for encrypting the index of the PC. The logic generates a second encrypted value by encrypting the first encrypted value using a value based on the tag of the PC (block 514). In some examples, the value based on the tag of the PC is the tag of the PC. In other examples, the value based on the tag of the PC is an encrypted tag of the PC. In an embodiment, the logic generates the second encrypted value by combining the tag of the PC (or the encrypted tag of the PC) and the encrypted index of the PC using Boolean XOR logic.

The logic generates a third encrypted value by encrypting the first encrypted value using a value based on the target address (block 516). In some examples, the value based on the target address is the target address. In other examples, the value based on the target address is an encrypted target address. In an embodiment, the logic generates the third encrypted value by combining the target address (or the encrypted target address) and the encrypted index of the PC portion using Boolean XOR logic. The logic writes each of the security tag, the second encrypted value and the third encrypted value into respective fields in an entry of a branch predictor table (block 518).

Figure 6:
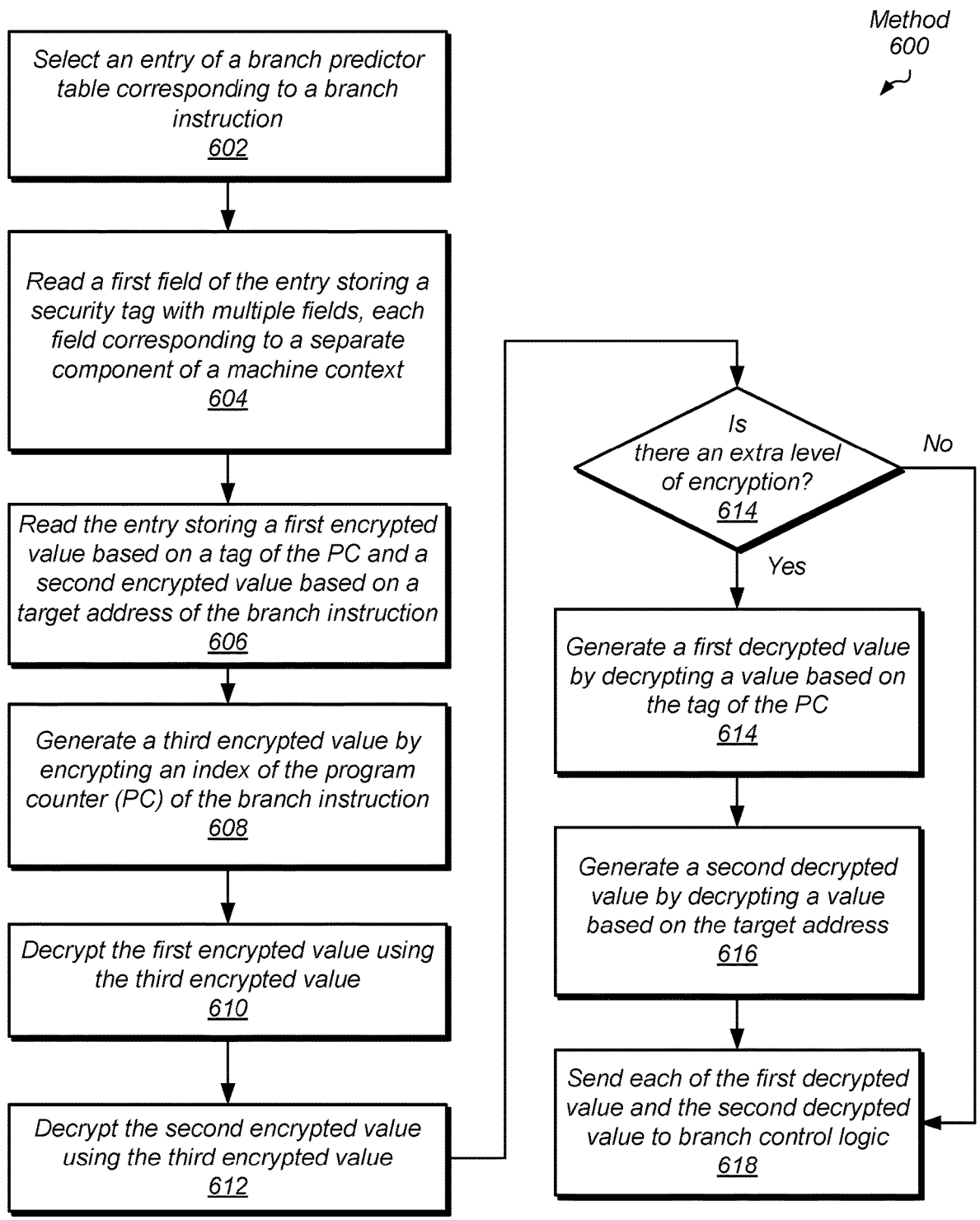
FIG. 6 is a flow diagram of one embodiment of a method for efficiently protecting branch prediction information.

Turning now to FIG. 6, a generalized flow diagram of one embodiment of a method 600 for efficiently protecting branch prediction information is shown. Logic in a processor core selects an entry of a branch predictor table corresponding to a branch instruction (block 602). For example, a branch instruction has been fetched, decoded, and prior to issue, it is being predicted. The logic generates a hash value from at least a portion of the PC of the branch instruction and indexes into the branch prediction table. The logic selects the branch prediction table based on the type of the branch prediction table. Alternatively, the logic indexes into multiple branch prediction tables without initially determining the type of the branch instruction.

After indexing into the branch prediction table, a hit occurs on a table entry of the branch prediction table. The logic reads a first field of the entry storing a security tag with multiple fields, each field corresponding to a separate component of a machine context (block 604). The logic reads a second field of the entry storing a first encrypted value based on the tag of the PC and a second encrypted value based on a target address of the branch instruction (block 606). The logic generates a third encrypted value by encrypting an index of the program counter (PC) of the branch instruction using a cryptographic key (block 608).

The logic decrypts the first encrypted value using the third encrypted value (block 610). In an embodiment, the logic combines the first encrypted value (encrypted tag of the PC) and the third encrypted value (encrypted index of the PC of the branch instruction) using the Boolean XOR logic to generate the decrypted tag of the PC. In some embodiments, since the tag of the PC was encrypted earlier during allocation of the table entry with Boolean XOR logic, the same logic is used to decrypt it. The logic decrypts the second encrypted value using the third encrypted value (block 612). In an embodiment, the logic combines the second encrypted value (encrypted target address) and the third encrypted value (encrypted portion of the PC) using the Boolean XOR logic to generate the decrypted branch target address.

If there is an extra level of encryption ("yes" branch of the conditional block 614), then the logic generates a first decrypted value by decrypting a value based on the tag of the PC using the given cryptographic key (block 614). The value based on the tag of the PC is an encrypted tag of the PC. The logic generates a second decrypted value by decrypting a value based on the target address using the cryptographic key (block 616). The logic sends each of the first decrypted value (tag of the PC) and the second decrypted value (branch target address) to branch control logic. For example, the branch control logic verifies whether the security tag of the branch instruction matches the security tag read out from the branch prediction table. Additionally, in some embodiments, the branch control logic compares the tag of the PC of the branch instruction accessing the table and the tag of the PC read out from the table.

Figure 7:
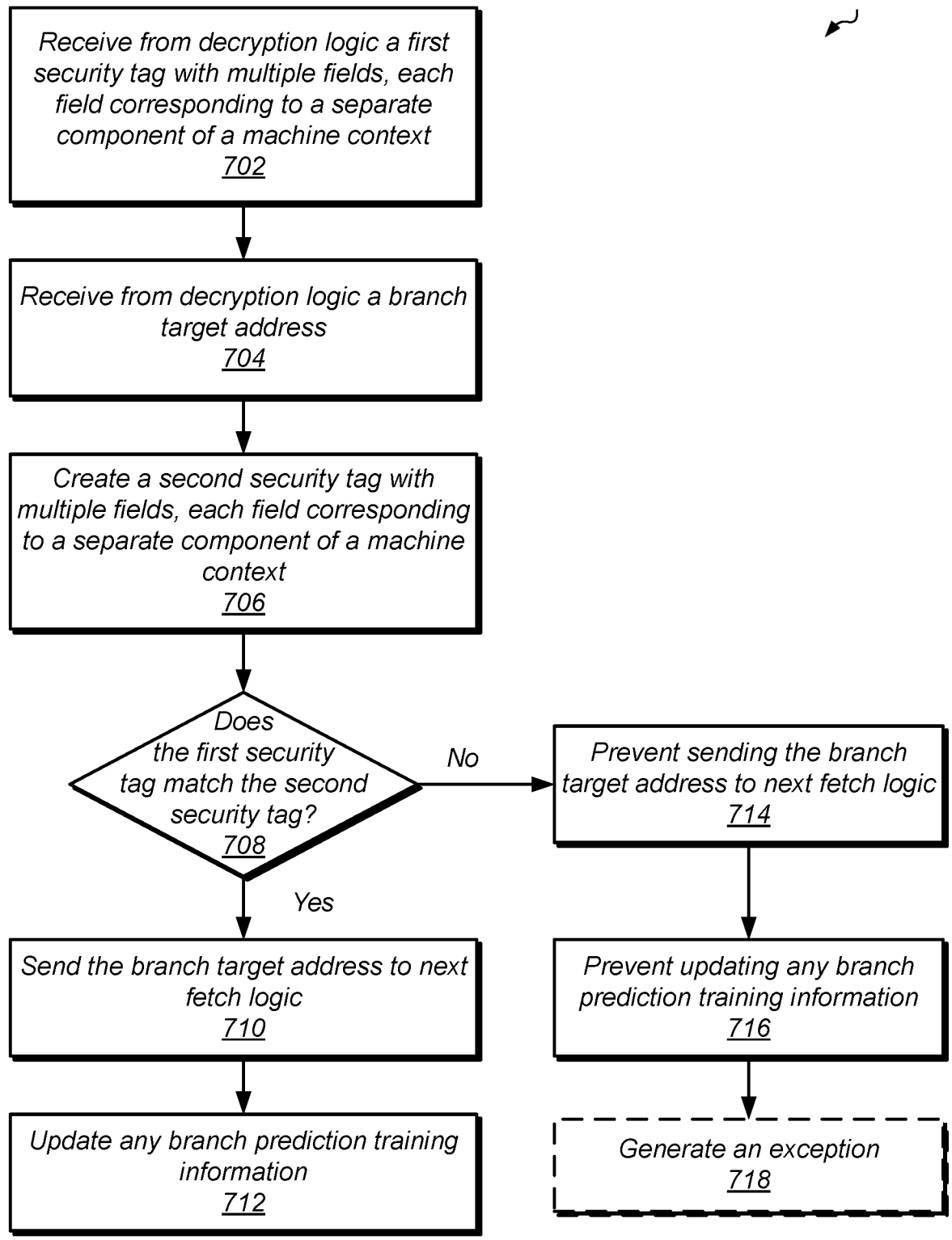
FIG. 7 is a flow diagram of one embodiment of a method for efficiently protecting branch prediction information.

Turning now to FIG. 7, a generalized flow diagram of one embodiment of a method 700 for efficiently protecting branch prediction information is shown. Logic in a processor core receives from decryption logic a first security tag with multiple fields, each field corresponding to a separate component of a machine context (block 702). For example, the first security tag was previously read out from a branch prediction table. The logic receives from decryption logic a branch target address (block 704). For example, the branch target address was previously read out from the same table entry of the same branch prediction table as the first security tag. The logic that performed the reading also performed the decryption.

The logic creates a second security tag with multiple fields, each field corresponding to a separate component of a machine context (block 706). The second security tag is based on machine context of a branch instruction that hit on the table entry storing the first security tag and the branch target address, which were read out. The logic compares the first security tag and the second security tag. In some embodiments, the logic also logic compares the tag of the PC of the branch instruction accessing the table and the tag of the PC read out from the table. If the first security tag matches the second security tag ("yes" branch of the conditional block 708), then the logic sends the branch target address to next fetch logic (block 710). The branch prediction information, such as the branch target address, is used. The logic updates any branch prediction training information (block 712) such as one or more of local and global branch history information. The steps performed in blocks 710-712 are only performed if any comparison of the tags of the PC also match.

If the first security tag does not match the second security tag ("no" branch of the conditional block 708), then the logic prevents sending the branch target address to next fetch logic (block 714). In addition, the logic prevents updating any branch prediction training information (block 716) such as one or more of local and global branch history information. In some embodiments, the logic generates an exception (block 718). The steps performed in blocks 714-716 are also performed if any comparison of the tags of the PC results in a mismatch.

Cipher for Branch Prediction Logic

Branch predictors are typically designed to have very low latency (e.g., to produce results in only a few clock cycles) in order to avoid instruction pipeline stalls and/or additional pipeline stages as issuance of subsequent instructions can be dependent on the predictions. In embodiments in which branch prediction information is encrypted, it can therefore be important that branch prediction logic 300 and 400 implement encryption and decryption in a manner that does not substantially increase this latency as doing so may substantially hinder performance—thus ruining the user experience in spite of any security gains afforded by the encryption.

As discussed above, branch prediction logic 300 may perform encryption of a branch target address 350 and a PC tag 336 by initially encrypting a PC index 334 at encryption logic 340 and then combining the result with the branch target address 350 at encryption logic 360 to produce an encrypted branch target address 362 and with the PC tag 336 at encryption logic 370 to produce an encrypted PC tag 372. An advantage of encrypting the target address 350 in this manner is that encryption of the address 350 can begin in parallel at encryption logic 340 while the corresponding branch instruction resolves and before the address 350 becomes known. Once this initial encryption result is determined and the branch target address 350 becomes known, they can quickly be combined at logic 360 using an efficient operation such as an XOR operation, which adds negligible latency overhead.

As also discussed, branch prediction logic 400 may similarly perform decryption of an encrypted branch target address 362 and an encrypted PC tag 372 by initially encrypting a PC index 434 at encryption logic 440 and then combining the result with the encrypted branch target address 362 at decryption logic 460 to produce the decrypted branch target address 350 and with the PC tag 336 at encryption logic 370 to produce the decrypted PC tag 336. An advantage of decrypting an encrypted branch target address 362 in this manner is that decryption of the address 362 at decryption logic 470 can be performed while address 362 is being read from branch prediction table 310 and before address 362 becomes known. Once this initial encryption result is determined and the encrypted branch target address 362 is read, they can quickly be combined at logic 460 using an efficient operation such as an XOR operation, which again adds negligible latency overhead.

To further reduce the encryption and decryption latencies, branch prediction logic 300 and 400 (and more specifically encryption logic 340 and encryption logic 440) may use an efficient cipher to perform this initial encryption and initial decryption. As will be described below, in various embodiments, logic 300 and 400 employs a cipher that performs multiple XOR operations and cipher rounds in parallel in order to shorten the depth of the cipher without reducing the strength of the cipher. This reduced depth allows logic 300 and 400 to perform the cipher in fewer clock cycles.

Figure 8:
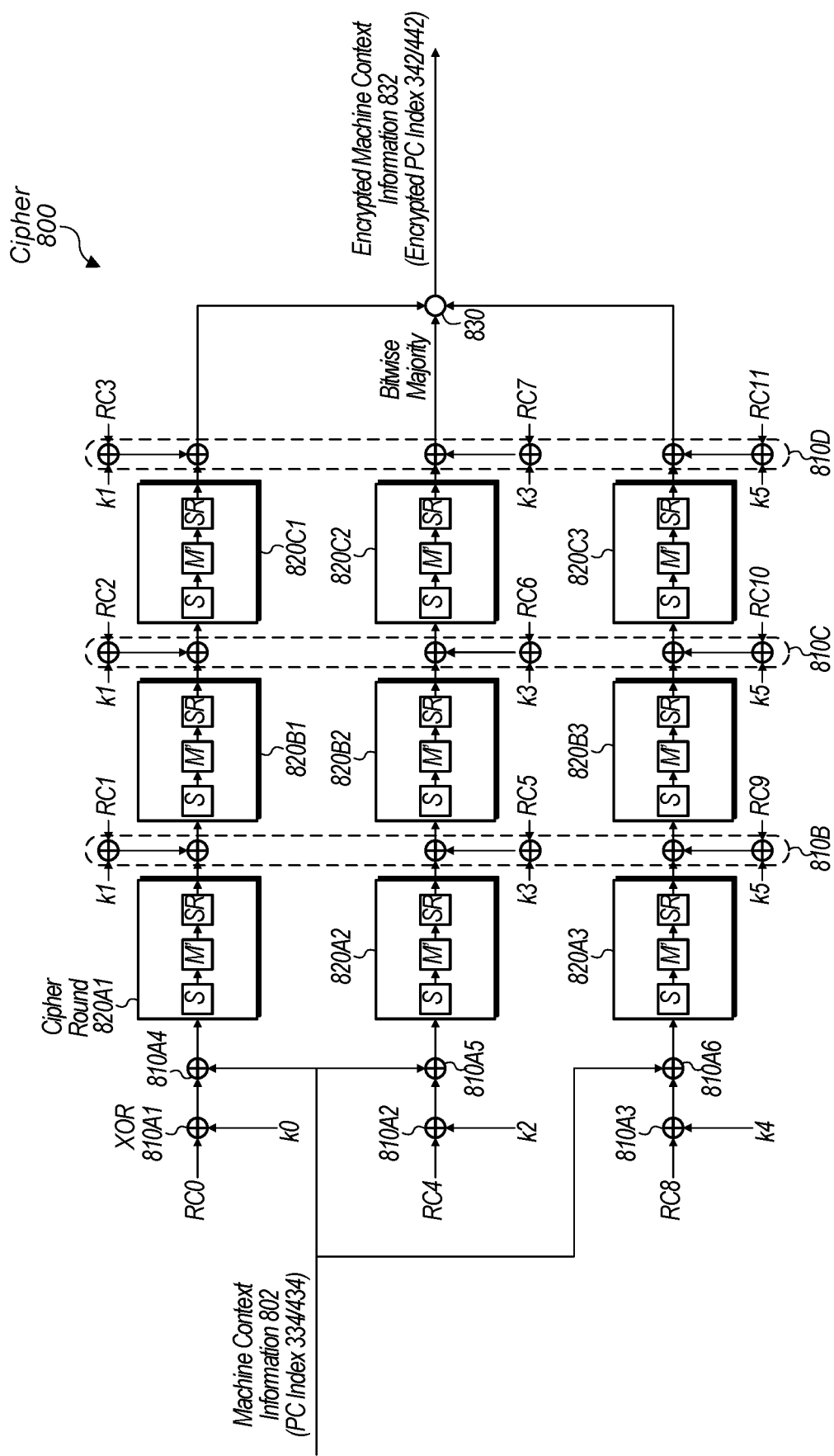
FIG. 8 is a block diagram of one embodiment of a cipher usable by the branch prediction logic to encrypt and decrypt branch prediction information.

Turning now to FIG. 8, a block diagram of a cipher 800 is depicted. In various embodiments, cipher 800 is implemented by encryption logic 340 and encryption logic 440 discussed above. In the illustrated embodiment, cipher 800 receives machine context information 802 and processes it through multiple XOR operations 810, cipher rounds 820A1-C3, and a bitwise majority 830. In other embodiments, cipher 800 may be implemented differently. For example, more (or less) elements 810-830 may be included, cipher 800 may end with an operation other than a bitwise majority 830. In some embodiments, cipher 800 may include operations discussed above with respect encryption logic 360, encryption logic 370, decryption logic 460, and/or decryption logic 470.

Machine context information 802, in various embodiments, pertains to the machine context in which a branch instruction executes. Accordingly, if a branch target address 350 is being stored in branch prediction table 310 by branch prediction logic 300, machine context information 802 may pertain to the machine context of a recently resolved branch instruction. If a branch target address 350 is being read from branch prediction table 310, machine context information 802 may pertain to the machine context of an unresolved branch instruction for which the address 350 is being used as a predicted outcome. In the illustrated embodiment, machine context information 802 includes a PC index 334 or 434—the portion of the PC used to index into table 310. Machine context information 802 may, however, include other components of machine context as noted above. For example, in some embodiments, information 802 may include one or more components of security tag 110 such as an exception level 112 associated with execution of the branch instruction, a privileged/guarded mode indication 114 identifying whether the branch instruction executes in a privileged or guarded mode, a process identifier 116 associated with the branch instruction, or a virtual machine identifier 118 for a virtual machine associated with the branch instruction. As noted above, in various embodiments, target address 350 may not be included as an input of cipher 800 so that cipher 800 can be performed while a branch instruction resolves to determine the target address 350 or while an encrypted target address 362 is being retrieved from branch prediction table 310.

As shown, cipher 800 may begin with the performance an initial round of XOR operations 810A1-3 combing keys k0, k2, and k4 with round constants RC0, RC4, and RC8 respectively. In various embodiments, keys k0-5 are provided by the processor including branch prediction logic 300 and 400 as cryptographic keys that may change from one execution session to the next, after a given time period, etc. For example, in some embodiments, the processor may derive keys k1-k5 at boot and continue to use them until a subsequent boot. In other embodiments, k1-k5 may be updated more (or less) frequently. In various embodiments, round constants RC0-11 are constant values for each performance of cipher 800, but may vary from one cipher round 820 to the next. Although any suitable round constants may be used, in some embodiments, round constants RC0-11 correspond the round constants RC0-RC11 used in the PRINCE cipher algorithm. As shown, the outputs of the initial XOR operations 810A1-3 may then be combined with an instance of machine context information 802 at XOR operations 810A4-6.

Cipher 800 may then include performance of multiple cipher rounds 820A. In various embodiments, a cipher round 820 is a collection of operations that are repeated to further encrypt an input and strengthen the encryption. In the illustrated embodiment, a given cipher round 820 includes a substitution-box (Sbox) (shown as S in FIG. 8), a first matrix multiplication (shown as M'), and a second matrix multiplication (shown as SR). In some embodiments, cipher rounds 820 implement PRINCE core cipher rounds using the Sbox defined in PRINCE, matric M' defined in PRINCE for the first multiplication, and the shift-rows (SR) matrix defined in PRINCE for the second multiplication. In other embodiments, cipher rounds 820 may be implemented differently. As shown, the results of cipher rounds 820A may be provided to another set of XOR operations 810B to be combined with keys k1, k3, and k5 and round constants RC1, RC6, and RC9. The results of XOR operations 810B may then be provided to another set of cipher rounds 820B, which, in turn, may provide their outputs as inputs for another set of XOR operations 810C. There, the inputs may be combined with keys k1, k3, and k5 and round constants RC2, RC6, and RC10. These results may then be provided as inputs for another set of cipher rounds 820C before being provided to another set of XOR operations 810D for combination with keys k1, k3, and k5 and round constants RC3, RC7, and RC11.

As noted above, in various embodiments, XOR operations 810 and cipher rounds 820 are performed in parallel in order to reduce the depth of cipher 800 without reducing the strength of cipher 800. For example, logic 340 and 440 may perform XOR operations 810A1-3 in parallel, followed by XOR operations 810A3-6 in parallel, followed by cipher rounds 820 in parallel, and so forth. In the illustrated embodiment, this parallelism results in cipher 800 having a depth of three cipher rounds 820 as opposed to nine cipher rounds 820 if they had been performed serially—and thus reduces the time to perform cipher 800 by a third. Still further, as noted above, cipher 800 may be performed while a branch instruction determining a target address 350 resolves or while an encrypted target address is retrieved from branch prediction table 310.

To combine the results from these parallel operations, cipher 800 may conclude with a bitwise majority operation 830—a bitwise majority operation being a bitwise operation that returns true if and only if a majority of the inputs are true. For example, if the first input is 1111, the second input is 1100, and the third input is 1010, the output of a bitwise majority operation is 1110. In other embodiments, however, other types of operations may be used such as a parity operation, an addition operation, one or more XOR operations, etc. The resulting encrypted machine context information 832 (including an encrypted PC index 342 or 442) may then be provide to encryption logic 360 and 370 for encryption use or provided to decryption logic 460 and 470 for decryption use. As discussed above, logic 360 and 370 may combine (e.g., via an XOR operation) encrypted machine context information 832 with an input (e.g., PC tag 336, target address 350, or some other form of branch prediction information) to produce an encrypted result for storage in branch prediction table 310. Similarly, logic 460 and 470 may combine (e.g., via an XOR operation) encrypted machine context information 832 with an encrypted input (e.g., encrypted PC tag 372, encrypted target address 362, or some other form of encrypted branch prediction information) to produce a decrypted result for predicting an outcome of an unresolved branch instruction.

Figure 9A:
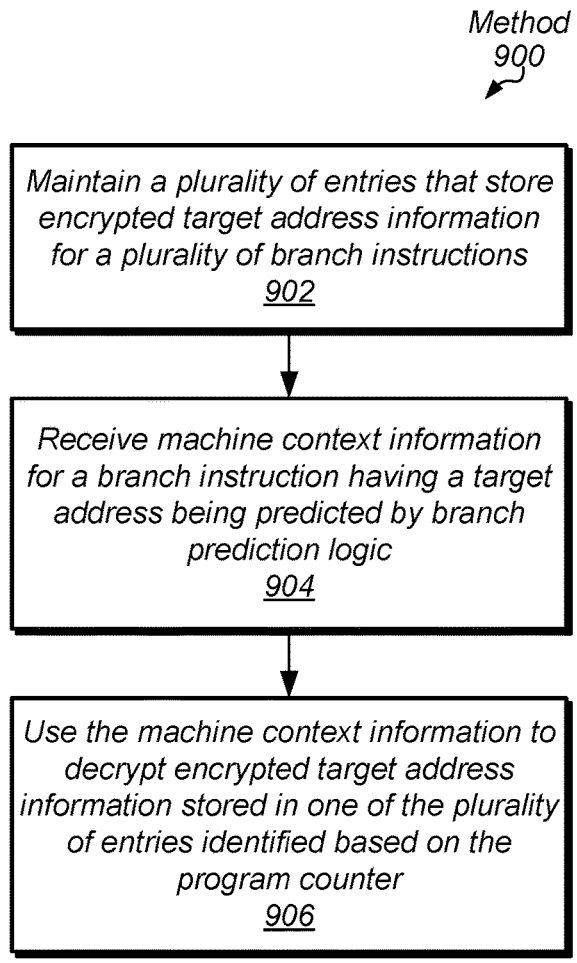
FIGS. 9A-C are flow diagrams of embodiments of methods for protecting branch prediction information using encryption.

Turning now to FIG. 9A, a flow diagram of a method 900 is depicted. Method 900 is one embodiment of a method performed by branch prediction logic, such as branch prediction logic 300 and 400, to protect branch prediction information.

In step 902, a table (e.g., branch prediction table 310) included the branch prediction logic maintains a plurality of entries that store encrypted target address information for a plurality of branch instructions. In some embodiments, the target address information includes offsets that are applied to the program counter to produce the target addresses being predicted by the branch prediction logic.

In step 904, the branch prediction logic receives machine context information (e.g., machine context information 802) for a branch instruction having a target address being predicted by the branch prediction logic. In various embodiments, the machine context information includes a program counter (e.g., having an index portion 334) associated with the branch instruction. In some embodiments, the machine context information includes a process identifier (e.g., process identifier 116) for a process associated with the branch instruction. In some embodiments, the machine context information includes an indication (e.g., guarded mode 114) of whether the branch instruction executes in a privileged mode. In some embodiments, the machine context information includes an exception level (e.g., exception level 112) associated with execution of the branch instruction. In some embodiments, the machine context information includes a virtual machine identifier (e.g., virtual machine identifier 118) for a virtual machine associated with the branch instruction.

In step 906, the branch prediction logic uses the machine context information to decrypt encrypted target address information stored in one of the plurality of entries identified based on the program counter. In various embodiments, the branch prediction logic decrypts the encrypted target address information by performing a cipher (e.g., cipher 800 in encryption logic 440) to encrypt the machine context information (e.g., encrypted information 832) and performing a Boolean exclusive-OR operation (e.g., at decryption logic 460) of the encrypted machine context information and the encrypted target address information. In various embodiments, the branch prediction logic performs the cipher while the encrypted target address information is being retrieved from the table using the program counter. In some embodiments, the branch prediction logic performs two or more rounds (e.g., rounds 820A, 820B, and 820C) of the cipher in parallel and combine results (e.g., via bitwise majority 830) of the two or more rounds performed in parallel to produce the encrypted machine context information. In some embodiments, the branch prediction logic decrypts an encrypted tag (e.g., encrypted PC tag 372) stored with the encrypted target address information by performing a Boolean exclusive-OR operation (e.g., at decryption logic 470) of the encrypted machine context information and the encrypted tag.

Figure 9B:
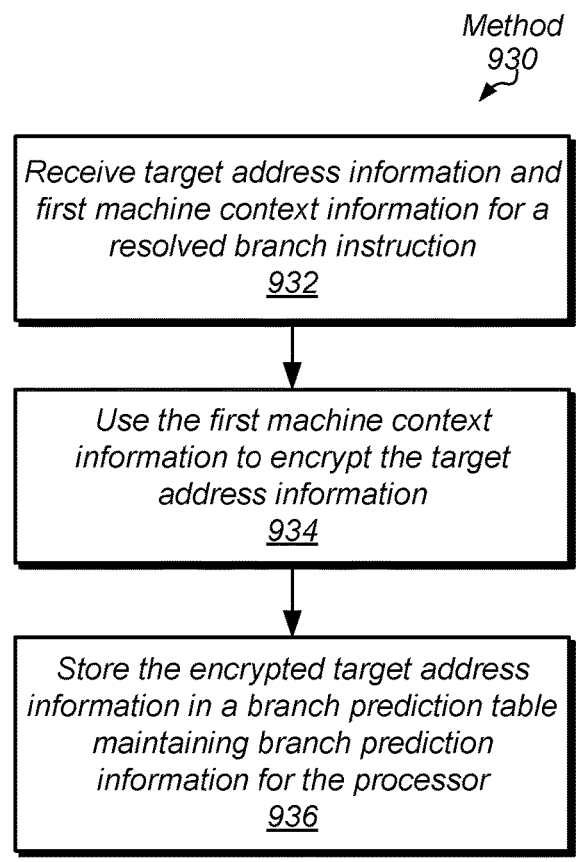

Turning now to FIG. 9B, a flow diagram of a method 930 is depicted. Method 930 is another embodiment of a method performed by branch prediction logic in a processor, such as branch prediction logic 300 and 400, to protect branch prediction information.

In step 932, the branch prediction logic receives target address information (e.g., branch target address 350) and first machine context information (e.g., machine context information 802) for a resolved branch instruction. In some embodiments, the first machine context information includes an index of a program counter (e.g., PC index 334) associated with the branch instruction, and the index of the program counter is used by the branch prediction logic to identify an entry in a branch prediction table (e.g., branch prediction table 310) to store the encrypted target address information.

In step 934, the branch prediction logic uses the first machine context information to encrypt the target address information (e.g., encrypted target address 362). In various embodiments, step 940 includes inputting the first machine context information into a block cipher (e.g., cipher 800) and performing a Boolean exclusive-OR operation (e.g., at encryption logic 360) of the target address information and a first output (e.g., encrypted machine context information 832) of the block cipher to produce the encrypted target address information.

In step 936, the branch prediction logic stores the encrypted target address information in a branch prediction table (e.g., branch prediction table 310) maintaining branch prediction information for the processor. In some embodiments, method 930 further includes the branch prediction logic encrypting a program counter tag (e.g., PC Tag 336) of the branch instruction by performing a Boolean exclusive-OR (e.g., encryption logic 370) of the program counter tag and the first output of the block cipher and the branch prediction logic storing the encrypted program counter tag (e.g., encrypted PC tag 372) in the branch prediction table and with the encrypted target address information. In some embodiments, method 930 includes the branch prediction logic receives second machine context information (e.g., PC index 434) for a branch instruction being predicted by the branch prediction logic and decrypts the encrypted target address information by inputting the second machine context information into the block cipher (e.g., at encryption logic 440) and performing a Boolean exclusive-OR operation (e.g., at decryption logic 460) of the encrypted target address information and a second output of the block cipher (e.g., encrypted PC index 442) to produce the decrypted target address information.

Figure 9C:
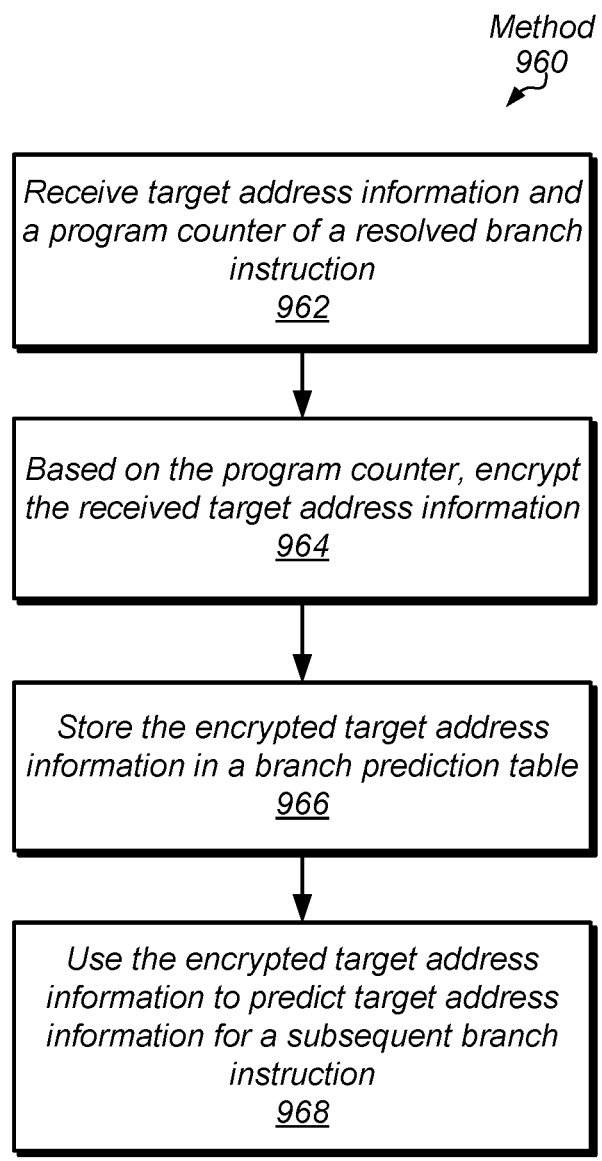

Turning now to FIG. 9C, a flow diagram of a method 960 is depicted. Method 960 is another embodiment of a method performed by branch prediction circuitry included in a processor, such as branch prediction logic 300 and 400, to protect branch prediction information.

In step 962, the branch prediction circuitry receives target address information (e.g., branch target address 350) and a program counter.

In step 964, the branch prediction circuitry encrypts, based on the program counter, the received target address information. In various embodiments, the branch prediction circuitry encrypts the received target address information by supplying a portion of the program counter (e.g., PC index 334) to a cipher (e.g., cipher 800 in encryption logic 340) to produce a ciphertext, the portion of the program counter being usable as an index into a branch prediction table (e.g., branch prediction table 310) to identify an entry in the branch prediction table for storing the encrypted target address information. In such an embodiment, the branch prediction circuitry performs a Boolean exclusive-OR operation (e.g., at encryption logic 360) of the ciphertext and the target address information to produce the encrypted target address information. In some embodiments, the branch prediction circuitry performs two or more rounds of the cipher in parallel (e.g., rounds 820A1, 820A2, and 820A3) and performs a bitwise majority operation (e.g., bitwise majority 830) to combine outputs of the two or more rounds to produce the ciphertext (e.g., encrypted PC index 342). In some embodiments, the branch prediction circuitry receives, with the program counter, one or more additional components of machine context (e.g., machine context information 802) and encrypts the received target address information based on the program counter and the one or more additional components of machine context. In some embodiments, the one or more additional components include a process identifier (e.g., process identifier 116) associated with the resolved branch instruction, an indication of whether the resolved branch instruction executed in a privileged mode (e.g., guarded mode 114), an exception level associated with execution of the resolved branch instruction (e.g., exception level 112), or a virtual machine identifier (e.g., virtual machine identifier 118) for a virtual machine associated with the resolved branch instruction.

In step 966, the branch prediction circuitry stores the encrypted target address information (e.g., encrypted target address 362) in a branch prediction table. In step 968, the branch prediction circuitry uses the encrypted target address information to predict target address information for a subsequent branch instruction.

Exemplary Processor Core

Figure 10:
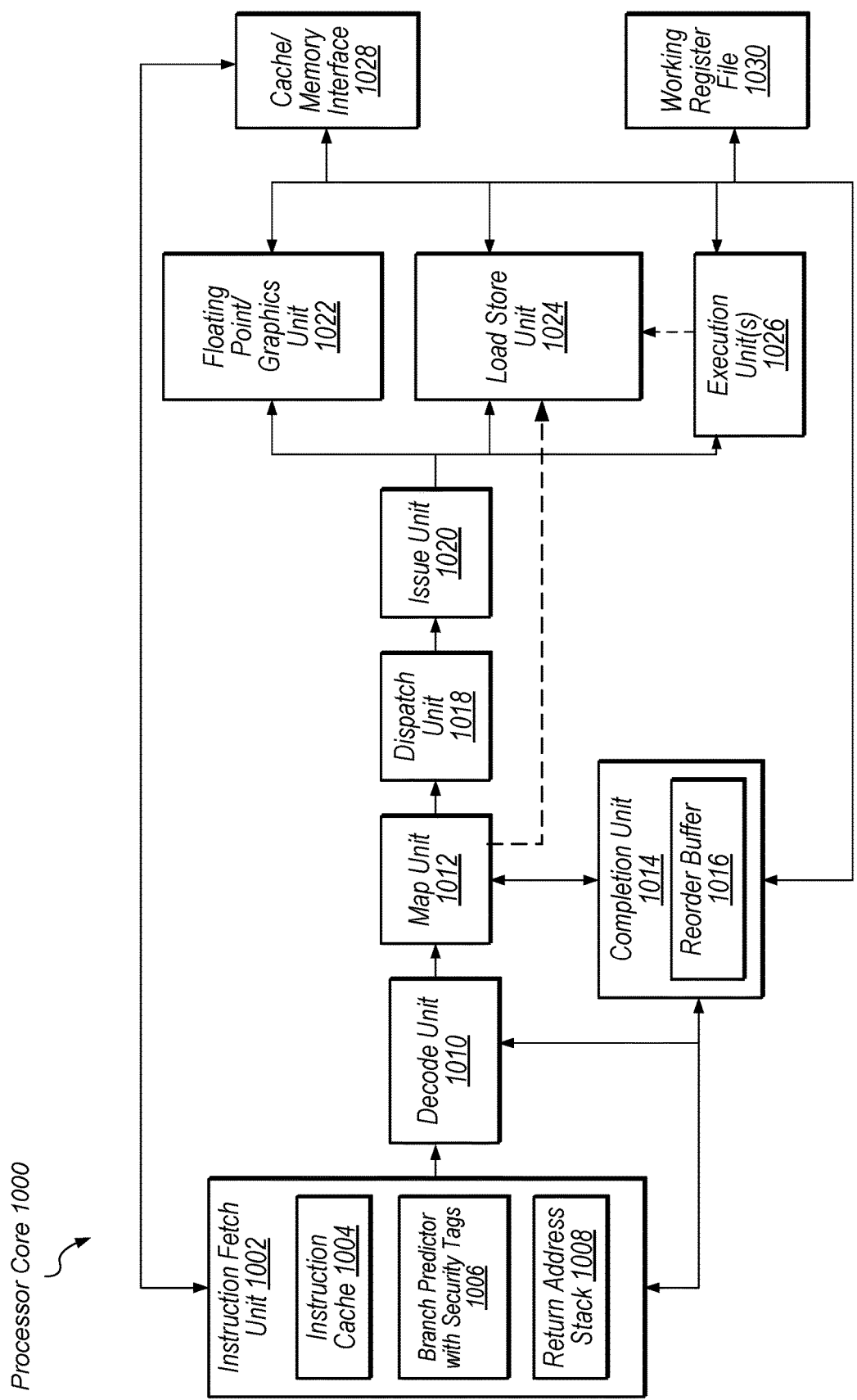
FIG. 10 is a block diagram of one embodiment of a processor core.

Turning now to FIG. 10, a block diagram illustrating one embodiment of a processor core 1000 is shown. In various embodiments, the logic of processor core 1000 is included in one or more cores of a central processing unit (CPU). Processor core 1000 includes instruction fetch unit (IFU) 1002 which includes an instruction cache 1004, branch predictor 1006 with security tags, and a return address stack (RAS) 1008. IFU 1002 also includes a number of data structures in addition to those shown such as an instruction translation lookaside buffer (ITLB), instruction buffers, and/or other structures configured to store state that is relevant to thread selection and processing (in multi-threaded embodiments of processor 1000).

In various embodiments, IFU 1002 includes multiple branch predictors including at least branch predictor 1006 with security tags. In some embodiments, branch predictor 1006 includes branch prediction logic similar to logic 300 (of FIG. 3) and logic 400 (of FIG. 4). For example, such a branch predictor is used to predict indirect branches. Fetched instructions are sent from the IFU 1002 to decode unit 1010, a map unit 1012, a dispatch unit 1018, and issue unit 1020. Issue unit 1020 is coupled to issue instructions to any of a number of instruction execution resources including execution unit(s) 1026, a load store unit (LSU) 1024, and/or a floating-point/graphics unit (FGU) 1022.

The instruction execution resources 1022-1026 are coupled to a working register file 1030. Additionally, LSU 1024 is coupled to cache/memory interface 1028. Reorder buffer 1016 is coupled to IFU 1002, decode unit 1010, working register file 1030, and the outputs of any number of instruction execution resources. It is noted that the illustrated embodiment is merely one example of how processor core 1000 is implemented. In other embodiments, processor core 1000 includes other components and interfaces not shown in FIG. 10. Alternative configurations and variations are possible and contemplated.

In one embodiment, IFU 1002 is configured to fetch instructions from instruction cache 1004 and buffer them for downstream processing. The IFU 1002 also requests data from a cache or memory through cache/memory interface 1028 in response to instruction cache misses, and predict the direction and target of control transfer instructions (e.g., branches).

The instructions that are fetched by IFU 1002 in a given clock cycle are referred to as a fetch group, with the fetch group including any number of instructions, depending on the embodiment. The branch predictor 1006 uses one or more branch prediction tables and mechanisms for determining a next fetch program counter sooner than the branch target address is resolved. In various embodiments, the predicted address is verified later in the pipeline by comparison to an address computed by the execution unit(s) 1026. For the RAS 1008, the predicted return address is verified when a return address (branch target address) is retrieved from a copy of the memory stack stored in the data cache via the LSU 1024 and the cache interface 1028.

In various embodiments, predictions occur at the granularity of fetch groups (which include multiple instructions). In other embodiments, predictions occur at the granularity of individual instructions. In the case of a misprediction, the front-end of pipeline stages of processor 1000 are flushed and fetches are restarted at the new address. IFU 1002 conveys fetched instruction data to decode unit 1010. In one embodiment, decode unit 1010 is configured to prepare fetched instructions for further processing.

Map unit 1012 maps the decoded instructions (or μops) to physical registers within processor 1000. Map unit 1012 also implements register renaming to map source register addresses from the μops to the source operand numbers identifying the renamed source registers. Dispatch unit 1018 dispatches μops to reservation stations (not shown) within the various execution units. Issue unit 1020 sends instruction sources and data to the various execution units for picked (i.e., scheduled or dispatched) instructions. In one embodiment, issue unit 1020 reads source operands from the appropriate source, which varies depending upon the state of the pipeline.

In the illustrated embodiment, processor core 1000 includes a working register file 1030 that stores instruction results (e.g., integer results, floating-point results, and/or condition signature results) that have not yet been committed to architectural state, and which serve as the source for certain operands. The various execution units also maintain architectural integer, floating-point, and condition signature state from which operands may be sourced.

Instructions issued from issue unit 1020 proceed to one or more of the illustrated execution units to be performed. In one embodiment, each of execution unit(s) 1026 is similarly or identically configured to perform certain integer-type instructions defined in the implemented ISA, such as arithmetic, logical, and shift instructions. Load store unit (LSU) 1024 processes data memory references, such as integer and floating-point load and store instructions and other types of memory reference instructions. In an embodiment, LSU 1024 includes a data cache (not shown) as well as logic configured to detect data cache misses and to responsively request data from a cache or memory through cache/memory interface 1028. Floating-point/graphics unit (FGU) 1022 performs and provide results for certain floating-point and graphics-oriented instructions defined in the implemented ISA.

In the illustrated embodiment, completion unit 1014 includes reorder buffer (ROB) 1016 and coordinates transfer of speculative results into the architectural state of processor 1000. Entries in ROB 1016 are allocated in program order. Completion unit 1014 includes other elements for handling completion/retirement of instructions and/or storing history including register values, etc. In some embodiments, speculative results of instructions are stored in ROB 1016 before being committed to the architectural state of processor 1000, and confirmed results are committed in program order. Entries in ROB 1016 are marked as completed when their results are allowed to be written to the architectural state. Completion unit 1014 also coordinates instruction flushing and/or replaying of instructions.

Exemplary Computer System

Figure 11:
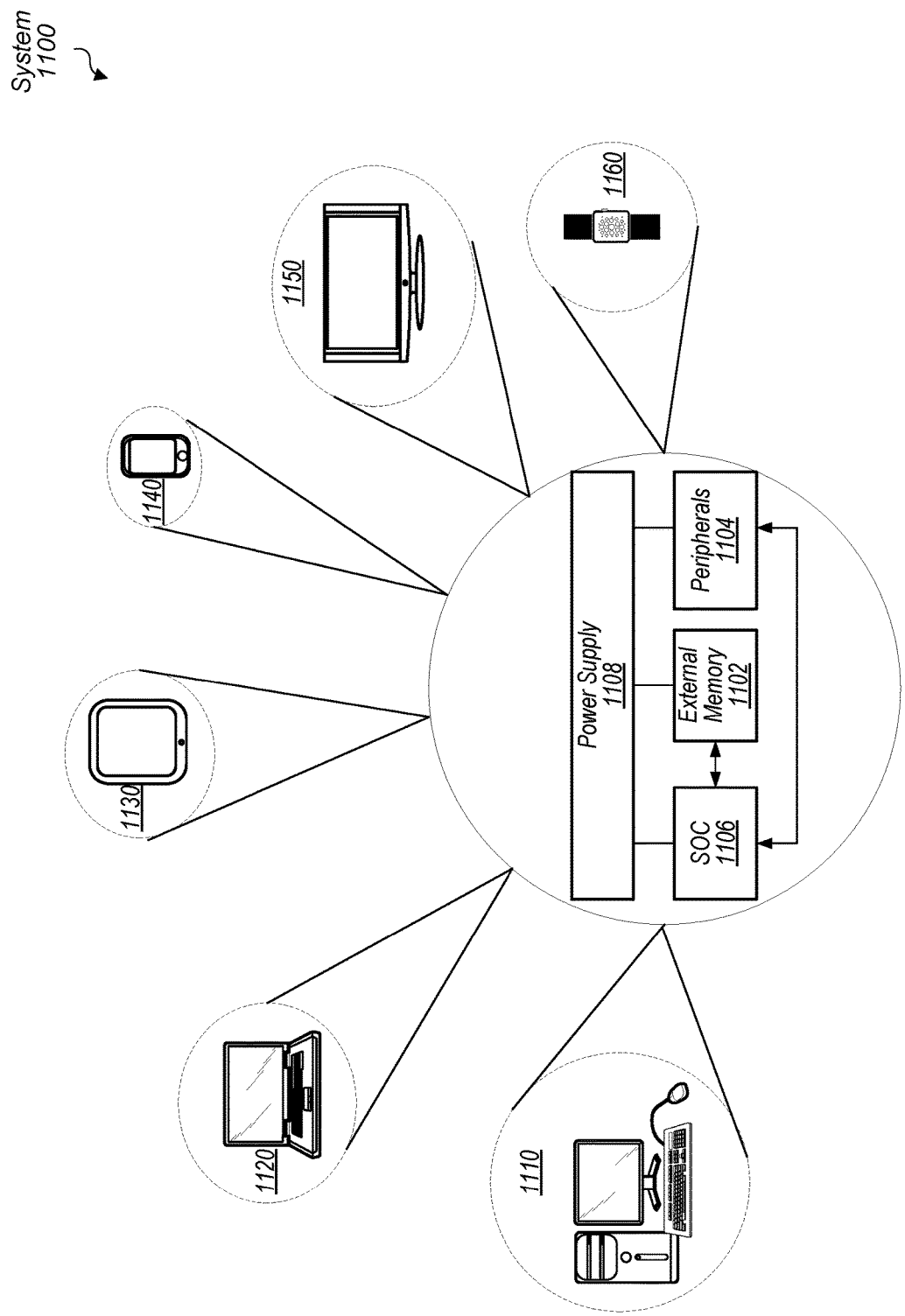
FIG. 11 is a block diagram of one embodiment of a system.

Turning now to FIG. 11, a block diagram of one embodiment of a system 1100 is shown. As shown, system 1100 represents chip, circuitry, components, etc., of a desktop computer 1110, laptop computer 1120, tablet computer 1130, cell or mobile phone 1140, television 1150 (or set top box coupled to a television), wrist watch or other wearable item 1160, or otherwise. Other devices are possible and are contemplated. In the illustrated embodiment, the system 1100 includes at least one instance of a system on chip (SoC) 1106 which includes multiple processors and a communication fabric. In some embodiments, SoC 1106 includes one or more processor cores similar to processor pipeline core 1000 (of FIG. 10), which includes branch prediction logic similar to logic 300 (of FIG. 3) and logic 400 (of FIG. 4). In various embodiments, SoC 1106 is coupled to external memory 1102, peripherals 1104, and power supply 1108.

A power supply 1108 is also provided which supplies the supply voltages to SoC 1106 as well as one or more supply voltages to the memory 1102 and/or the peripherals 1104. In various embodiments, power supply 1108 represents a battery (e.g., a rechargeable battery in a smart phone, laptop or tablet computer). In some embodiments, more than one instance of SoC 1106 is included (and more than one external memory 1102 is included as well).

The memory 1102 is any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices are coupled onto a circuit board to form memory modules such as single inline memory modules (SIMMs), dual inline memory modules (DIMMs), etc. Alternatively, the devices are mounted with a SoC or an integrated circuit in a chip-on-chip configuration, a package-on-package configuration, or a multi-chip module configuration.

The peripherals 1104 include any desired circuitry, depending on the type of system 1100. For example, in one embodiment, peripherals 1104 includes devices for various types of wireless communication, such as Wi-Fi, Bluetooth, cellular, global positioning system, etc. In some embodiments, the peripherals 1104 also include additional storage, including RAM storage, solid state storage, or disk storage. The peripherals 1104 include user interface devices such as a display screen, including touch display screens or multi-touch display screens, keyboard or other input devices, microphones, speakers, etc.

In various embodiments, program instructions of a software application may be used to implement the methods and/or mechanisms previously described. The program instructions describe the behavior of hardware in a high-level programming language, such as C. Alternatively, a hardware design language (HDL) is used, such as Verilog. The program instructions are stored on a non-transitory computer readable storage medium. Numerous types of storage media are available. The storage medium is accessible by a computer during use to provide the program instructions and accompanying data to the computer for program execution. In some embodiments, a synthesis tool reads the program instructions in order to produce a netlist including a list of gates from a synthesis library.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An integrated circuit, comprising:
   a branch prediction circuit including a table configured to maintain a plurality of entries that store encrypted branch prediction information for a plurality of branch instructions; and
   wherein the branch prediction circuit is configured to:
      receive machine context information for a branch instruction being predicted by the branch prediction circuit, wherein the machine context information includes a program counter associated with the branch instruction; and
      use the machine context information to decrypt the encrypted branch prediction information stored in one of the plurality of entries.

2. The integrated circuit of claim 1, wherein a particular entry in the table corresponding to the branch instruction includes a security tag having one or more fields; and
   wherein the branch prediction circuit is configured to compare data within the received machine context information to values of the one or more fields of the particular entry in order to determine whether access to the encrypted branch prediction information is permitted.

3. The integrated circuit of claim 2, wherein a particular one of the one or more fields of the security tag includes permissible exception levels for execution of the branch instruction.

4. The integrated circuit of claim 2, wherein a particular one of the one or more fields of the security tag specifies a process identifier for a process associated with the branch instruction.

5. The integrated circuit of claim 2, wherein a particular one of the one or more fields of the security tag includes an indication of whether the branch instruction executes in a privileged mode.

6. The integrated circuit of claim 2, wherein a particular one of the one or more fields of the security tag specifies a virtual machine identifier for a virtual machine associated with the branch instruction.

7. The integrated circuit of claim 1, wherein the branch prediction information is a branch target address.

8. The integrated circuit of claim 1, wherein the branch prediction circuit is configured to:
   decrypt the encrypted branch prediction information by:
      performing a cipher to encrypt the machine context information; and
      performing a Boolean exclusive-OR operation of the encrypted machine context information and the encrypted branch prediction information.

9. A method, comprising:
   maintaining, by a branch prediction circuit in a processor, a table configured to store a plurality of entries with encrypted branch prediction information for a plurality of branch instructions;
   receiving, by the branch prediction circuit, machine context information for a branch instruction being predicted by the branch prediction circuit, wherein the machine context information includes a program counter associated with the branch instruction; and
   using, by the branch prediction circuit, the machine context information to decrypt the encrypted branch prediction information stored in a particular one of the plurality of entries corresponding to the branch instruction.

10. The method of claim 9, further comprising:
preventing, by the branch prediction circuit, access to the encrypted branch prediction information in response to determining that at least one of an exception level or a virtual machine identifier for the branch instruction do not match respective values in fields of the particular entry.

11. The method of claim 9, further comprising:
preventing, by the branch prediction circuit, access to the encrypted branch prediction information in response to determining that a guarded mode identifier for the branch instruction does not match a guarded mode identifier value in a particular field of the particular entry.

12. The method of claim 9, wherein the branch prediction information is a branch target address.

13. A computing device, comprising:
a processor that includes a branch prediction circuit configured to:
  access a table with a plurality of entries that store encrypted branch prediction information for a plurality of branch instructions;
  receive machine context information for a branch instruction being predicted by the branch prediction circuit, wherein the machine context information includes a program counter associated with the branch instruction; and
  use the machine context information to access the encrypted branch prediction information stored in a particular one of the plurality of entries, and to decrypt the encrypted branch prediction information.

14. The computing device of claim 13, wherein the particular entry includes a security tag having one or more fields; and
wherein the branch prediction circuit is configured to compare data within the received machine context information to values of the one or more fields of the particular entry in order to determine whether access to the encrypted branch prediction information is permitted.

15. The computing device of claim 14, wherein a particular one of the one or more fields of the security tag includes permissible exception levels for execution of the branch instruction.

16. The computing device of claim 13, wherein the branch prediction information is a branch target address.

17. The computing device of claim 13, wherein the branch prediction circuit is configured to decrypt the encrypted branch prediction information by:
performing a cipher to encrypt the machine context information; and
performing a Boolean exclusive-OR operation of the encrypted machine context information and the encrypted branch prediction information.

\* \* \* \* \*